(12) United States Patent
Rooker et al.

(10) Patent No.: US 12,155,690 B1
(45) Date of Patent: Nov. 26, 2024

(54) MANAGING NETWORK MITIGATION TECHNIQUES

(71) Applicant: Amazon Technologies, Inc., Seattle, WA (US)

(72) Inventors: Kelly Anne Rooker, Ellicott City, MD (US); Thomas Bradley Scholl, Seattle, WA (US); Kushal Mall, Issaquah, WA (US); Darshan Narayana Reddy, San Mateo, CA (US); Lewis Iain McLean, Edinburgh (GB); Andrew Robert Hassall, Brigg (GB); Grace Marie Hatamyar, Bristol (GB); Bradford Sachin Chatterjee, Snohomish, WA (US); Sidath Manawadu, The Ponds (AU); Bobby Brown, Sydney (AU); John Shields, Redmond, WA (US); Karthik Chandrashekar, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 17/643,762

(22) Filed: Dec. 10, 2021

(51) Int. Cl.
*H04L 29/06* (2006.01)
*H04L 9/40* (2022.01)
(Continued)

(52) U.S. Cl.
CPC ...... *H04L 63/1458* (2013.01); *H04L 41/0816* (2013.01); *H04L 41/28* (2013.01); *H04L 63/1408* (2013.01)

(58) Field of Classification Search
None
See application file for complete search history.

(56) References Cited

U.S. PATENT DOCUMENTS 8,566,928 B2 * 10/2013 Dagon ................. G06F 16/951
726/22
8,613,089 B1 * 12/2013 Holloway ........... H04L 63/1458
709/227

(Continued)

OTHER PUBLICATIONS

Hachem, Nabil et al. Hadega: A novel MPLS-based mitigation solution to handle network attacks. 2012 IEEE 31st International Performance Computing and Communications Conference (IPCCC). https://ieeexplore.ieee.org/stamp/stamp.jsp?tp=&arnumber= 6407750 (Year: 2012).*

(Continued)

*Primary Examiner* — Jeremiah L Avery
(74) *Attorney, Agent, or Firm* — Knobbe, Martens, Olson & Bear, LLP

(57) ABSTRACT

The present disclosure generally relates to systems and methods for utilization of network mitigation techniques in the form of null address routing to mitigate coordinated DDOS attacks. A monitoring and mitigation service can characterize a command and control node as compromised or otherwise manipulated for purposes of generating distributed attacks. The monitoring and mitigation service can then identify network mitigation information in the form of null routing addresses that will cause network communications associated with the identified command and control node to be terminated or otherwise not delivered to the intended network-based resources. The monitoring and mitigation service can propagate the null routing address to routing components. The network mitigation information can be associated with expiration criteria for the routing components that receive and implement the network mitigation technique.

24 Claims, 7 Drawing Sheets

(51) Int. Cl.
*H04L 41/0816* (2022.01)
*H04L 41/28* (2022.01)

(56) References Cited

U.S. PATENT DOCUMENTS

| | | | | |
|---|---|---|---|---|
| 8,646,064 | B1* | 2/2014 | Holloway | H04L 63/1416 726/25 |
| 9,306,969 | B2* | 4/2016 | Dagon | H04L 63/1491 |
| 10,931,692 | B1* | 2/2021 | Mota | G06N 20/00 |
| 2007/0280114 | A1* | 12/2007 | Chao | H04L 63/1458 370/252 |
| 2014/0157405 | A1* | 6/2014 | Joll | H04L 63/1425 726/22 |
| 2015/0058976 | A1* | 2/2015 | Carney | H04L 63/1408 726/22 |
| 2017/0070531 | A1* | 3/2017 | Huston, III | H04L 63/0428 |
| 2017/0104773 | A1* | 4/2017 | Flacher | H04L 63/1458 |
| 2017/0279685 | A1* | 9/2017 | Mota | H04L 41/12 |
| 2017/0279832 | A1* | 9/2017 | Di Pietro | H04L 63/1458 |
| 2017/0279837 | A1* | 9/2017 | Dasgupta | H04L 63/1425 |
| 2017/0279847 | A1* | 9/2017 | Dasgupta | H04L 63/1425 |
| 2017/0279848 | A1* | 9/2017 | Vasseur | H04W 12/02 |
| 2017/0310691 | A1* | 10/2017 | Vasseur | H04L 41/0631 |
| 2018/0020002 | A1* | 1/2018 | Duca | H04L 63/0236 |
| 2018/0152466 | A1* | 5/2018 | Sartran | H04L 63/1416 |
| 2018/0241762 | A1* | 8/2018 | Savalle | G06N 3/006 |
| 2019/0124099 | A1* | 4/2019 | Matselyukh | H04L 41/16 |
| 2019/0297108 | A1* | 9/2019 | Johnston | H04L 63/1458 |
| 2020/0351244 | A1* | 11/2020 | Moore | H04L 61/4511 |
| 2024/0031392 | A1* | 1/2024 | Ahn | H04L 63/1416 |

OTHER PUBLICATIONS

Dimolianis, Marinos et al. Mitigation of Multi-vector Network Attacks via Orchestration of Distributed Rule Placement. 019 IFIP/IEEE Symposium on Integrated Network and Service Management (IM). https://ieeexplore.ieee.org/stamp/stamp.jsp?tp=&arnumber=8717838 (Year: 2019).*

Li, Hongxing et al. A Security Management Architecture for Time Synchronization Towards High Precision Networks. IEEE Access, vol. 9. https://ieeexplore.ieee.org/stamp/stamp.jsp?tp=&arnumber=9521206 (Year: 2021).*

* cited by examiner

MANAGING NETWORK MITIGATION TECHNIQUES

BACKGROUND

Generally described, computing devices and communication networks can be utilized to exchange data and/or information. In a common application, a computing device can request content from another computing device via the communication network. For example, a user having access to a computing device can utilize a software application to request content or access network-hosed applications/functionality from a computing device via the network (e.g., the Internet). In such embodiments, the user's computing device can be referred to as a client computing device and the network-based computing device can be referred to as a service provider. Additionally, the client computing device can collect or generate information and provide the collected information to a network-based computing device for further processing or analysis.

In some embodiments, a network service provider can provide computing device resources, such as virtual machine instances, that are configurable to execute tasks based on network service provider customers. In some scenarios, it may be possible that network-based computing device resources can be compromised such that a computing device, often independent of the customer, can manipulate the network-based resources. In one example, a plurality of compromised network-based resources can be coordinated by a computing device that can be characterized or referred to as a command and control node to disrupt the operation of another computing device, such as a coordinated distributed denial of service ("DDOS") attack.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
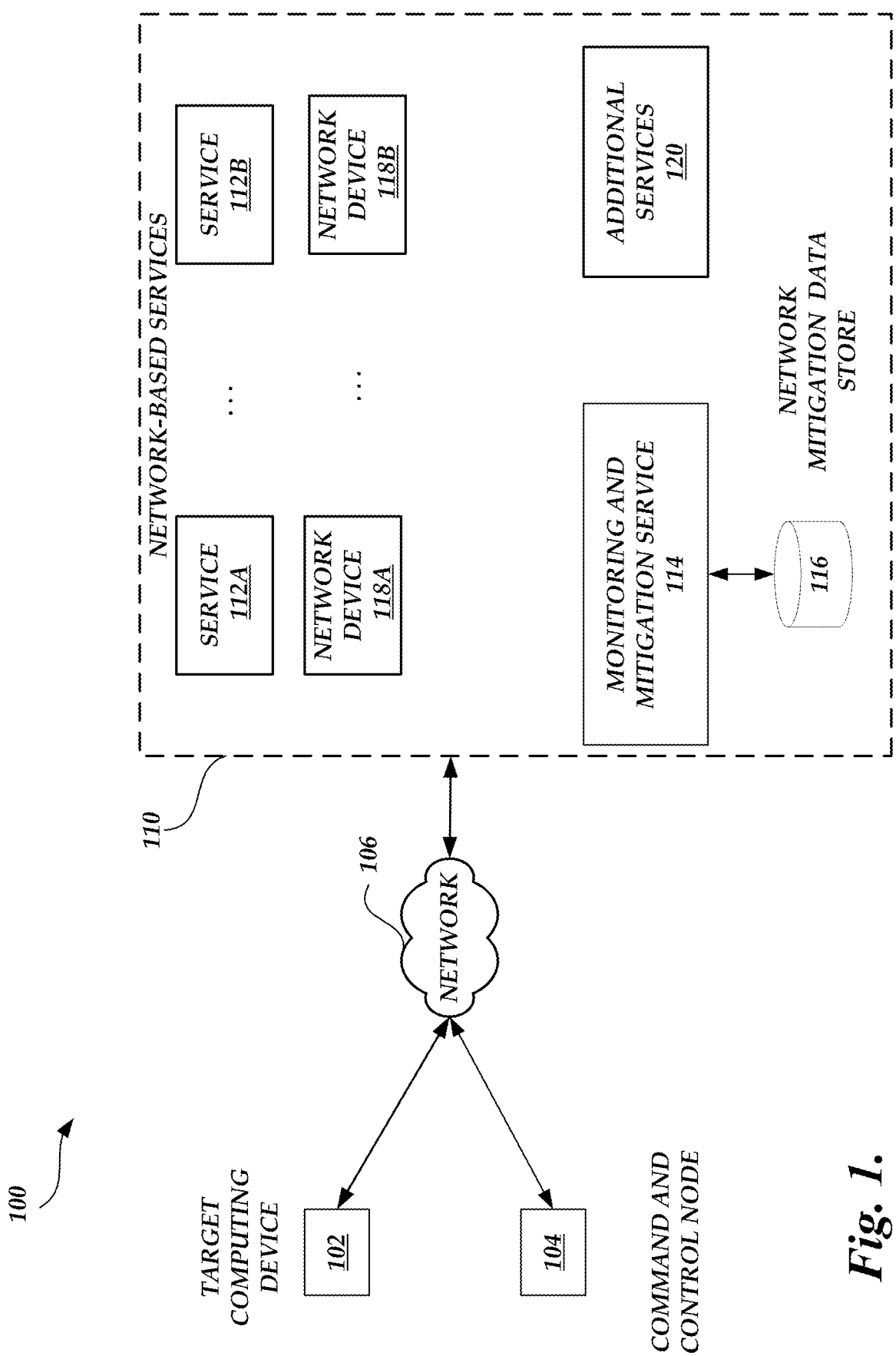
FIG. 1 is a block diagram depicting an illustrative system for implementing a network service for monitoring network based services and implementing network mitigation techniques according to one or more aspects of the present application.

Aspects of the present disclosure relate to systems and methods for mitigating manipulation of network-based computing resources utilizing network mitigation techniques. More specifically, one or more aspects of the present application correspond to the utilization of network mitigation techniques in the form of null address routing. Illustratively, a network service can implement a monitoring and mitigation service. In one aspect, the monitoring and mitigation service can monitor attributes of network resource usage, such as the configuration and execution, of network-based resources provided by a network service provider. Illustratively, the monitoring and mitigation service can process the monitored attributes to characterize or identify the use of network-based resources by a computing device that has compromised or otherwise manipulated the network-based resources for purposes of generating distributed attacks. The identified computing device can be characterized or identified as a command and control node that reflects monitored network behavior. The monitoring aspect of the monitoring and mitigation service can be implemented as a stand-alone service that performs the monitoring function and generates outputs indicative of the characterization of the computing device as a command and control node that has compromised or manipulated network-based resources. Alternatively, the monitoring aspect of the monitoring and mitigation service can be integrated as part of the monitoring and mitigation service.

In other aspects, the monitoring and mitigation service can process the identified or characterized command and control node to identify network mitigation techniques that preventor limit access to network-based resources. More specifically, the monitoring and mitigation service can identify network mitigation information in the form of null routing addresses that will cause network communications received from the identified command and control node to be terminated or otherwise not delivered to the intended network-based resources. Illustratively, the monitoring and mitigation service can propagate the network mitigation information, such as the null routing address, to routing components within the network service provider network. The routing components will then be updated with the network mitigation information to implement the network mitigation technique. In some embodiments, the network mitigation information can be associated with expiration criteria for the routing components that receive and implement the network mitigation technique.

Generally, traditional, manipulation of network-based resources by command and control nodes, such as a coordinated DDOS attacks presents significant technical challenges for network-based service providers. In one aspect, the targets (e.g., computing devices or computing networks) of the coordinated attacks are subject to significant disruption or limitation of operational status, which may be independent of the network service provider. Accordingly, the network service provider resources, can contribute to significant disruption to computing systems and networks, especially in situations of a network service provider that may offer customer multi-regional network resources. In other aspects, the manipulation of computing resources for purposes of generating large scale network attacks, such as DDOS attacks, especially in multi-tenant network resources can present significant inefficiencies for the network service provider, including limiting functionality of network resources, consuming network bandwidth and disrupting operations or functionality provided to other customers of the network service.

To address at least a portion of the above-described deficiencies, one or more aspects of the present application correspond to systems and methods for utilizing network mitigation information as part of network mitigation in scenarios in which a computing device has been characterized as compromising or otherwise manipulating network resources in a manner that is not desired or permissible, illustratively controlling network-based resources to elicit a coordinated attack on computing devices or computing network. The identified computing device can be generally referred to as a command and control node, which infers that the observed behavior is not permissible or desirable. The term command and control node does not have to be based on a particular set of non-permissible or non-desirable actions, which can vary. The network mitigation information can be provided to network routing components to cause disruption in communications being generated by the identified/characterized command and control node and preventing any further manipulation. The network mitigation information can be implemented across multiple regions hosted by the network service provider. Additionally, the network mitigation information can be further associated with expiration data or otherwise terminated in a manner such that performance of the network, including routing functionality, will revert to previous states. This further provides an efficiency in not requiring permanent changes to the routing information or affecting the long-term operation of the network functionality.

Although aspects of the present application will be described with regard to illustrative network components, interactions and routines, one skilled in the relevant art will appreciate that one or more aspects of the present application may be implemented in accordance with various environments, system architectures, computing device architectures and the like. Similarly, reference to specific devices, such as command and control nodes can be considered to be general references and not intended to provide additional meaning or configurations for individual computing devices. Additionally, the examples are intended to be illustrative in nature and should not be construed as limiting.

FIG. 1 depicts a block diagram of an embodiment of the system 100. The system 100 can comprise a network, the network connecting a number of computing devices 102, computing devices 104 and a network service 110. Illustratively, the various aspects associated with the network service 110 can be implemented as one or more components that are associated with one or more functions or services. The components may correspond to software modules implemented by one or more computing devices, which may be separate stand-alone computing device. Accordingly, the components of the network service 110 should be considered as a logical representation of the service, not requiring any specific implementation on one or more computing device.

The network 106 depicted in FIG. 1 connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network and the hardware and software in the network service provider that provide those services. In some embodiments, the network may be a content delivery network.

The computing devices 102 and computing devices 104 in FIG. 1 can connect to the network and the network service 110. Solely for purposes of illustration, computing devices 102 represent one or more targets of a coordinated attack, such as a DDOS attack generated by computing resources maintained by the network service 110. Computing devices 104 represent one or more computing devices that can be identified or characterized as command and control nodes and that provide configurations or commands to cause the use, manipulation or compromise of the computing resources maintained by the network service 110 as part of a coordinated attack. Accordingly, computing devices 102, 104 are illustrated separately in the present application for purposes of the functionality or role in a coordinated attack. Computing device 102 may be considered a "target" or "victim" in the attack. The computing device 102 may also be representative of a computing network associated with a plurality of computing devices. Additionally, computing device 102 may not be a customer or otherwise associated with the network service 110. Computing device 104 may be considered a command and control node that is the "instigator" or "coordinator" of the attack.

The computing devices 102, 104 can be configured to transmit a request to the network service 110 to illustratively access one or more network-based services using a communication protocol. The computing devices 102, 104 are configured to have at least one processor. That processor can be in communication with memory for maintaining computer-executable instructions. The computing devices 102, 104 may be physical or virtual. The computing devices may be mobile devices, personal computers, servers, or other types of devices. The computing devices 102, 104 may have a display and input devices through which a user can interact with the user-interface component. The configuration or implementation of computing devices 102 and computing devices 104 do not have to be identical.

Illustratively, the network service 110 can include a plurality of network-based services that can provide functionality responsive to configurations/requests transmitted by the client computing devices 102, such as in the implementation of a set of microservices that are configured to provide underlying functionality to applications hosted by a service provider. As illustrated in FIG. 1, the network-based services include a set of network-based services 112A, 112B, etc. Illustratively, each network-based service can be configured with defined functionality based on configuration information or executable commands. As described herein, the network-based services 112A, 112B can be illustratively configured, manipulated or compromised in a manner by a command and control node to elicit or contribute to a coordinated attack, such as a DDOS attack. Additionally, in some embodiments, network-based services 112A, 112B represent different logical or geographic regions provided by the network service 110.

Each network-based service is associated with a data store 114A, 114B, etc. that will be illustratively configured to receive and maintain log files related to the execution of the individual service 112. The log file/log data is made up of individual log event data. As will be described, in some embodiments. This may be achieved without requiring custom functionality, such as agents. The depiction of the services 112 and data stores 114 are illustrative in nature and are not intended to depict any required particular architectural configuration, type of computing device or interconnection between devices.

Figure 2:
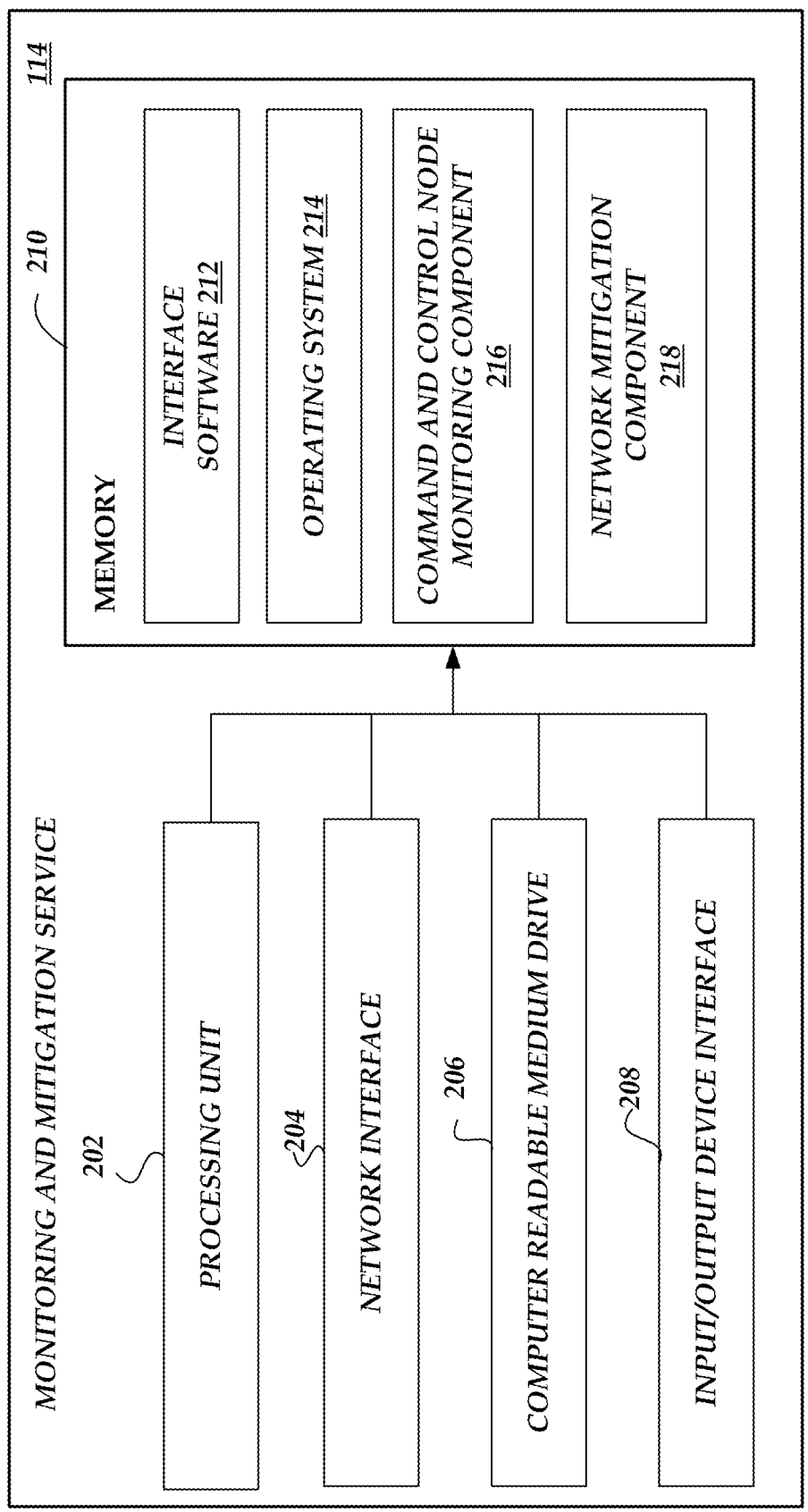
FIG. 2 is a block diagram illustrative of components of a monitoring and mitigation service in accordance with aspects of the present application.

The network service 110 further includes a monitoring and mitigation service 114 that represent the various functionality to monitoring the utilization of network-based resources, such as one or more of the network-based services 112A, 112B and identify or characterize a computing device, such as computing device 104, as a command and control node. For purposes of the present application, reference to computing device 104 and command and control node 104 should be considered synonymous as appropriate. The monitoring and mitigation service 114 also identifies the network mitigation information that will be utilized to mitigate communications between the identified/characterized command and control node 104 and the network-based services 112. The network mitigation information can illustratively include null address information for routing components. Illustrative components of the monitoring and mitigation service 114 is depicted in FIG. 2. The monitoring and mitigation service 114 is associated with a network mitigation data store 116 for maintaining the network mitigation information as described herein.

The network service 110 further includes routing components 118A, 118B that correspond to network routing functionality utilized by the network service 110 to facilitate communications between the network services 112 (or other components) and external computing devices, such as a command and control node. As will be described, one or more routing components 118A, 118B can be provided or updated with the network mitigation information by the monitoring and mitigation service 114. The network service 110 can further be associated with one or more additional services 120. Illustratively, the additional services 120 include stand-alone services or other services that may provide inputs to the monitoring and mitigation service 114 or otherwise implement a portion of the functionality associated with or utilized by the monitoring and mitigation service 114. For example, the additional services 120 may provide at least a portion of the monitoring and characterization of computing devices as command and control nodes. The additional services 120 may be hosted as part of network services 110 or may be an independent service hosted separately or by a third party.

FIG. 2 depicts one embodiment of an architecture of an illustrative server for implementing the monitoring and mitigation service 114 as described. The general architecture of the monitoring and mitigation service 114 depicted in FIG. 2 includes an arrangement of computer hardware and software components that may be used to implement aspects of the present disclosure. As previously discussed, the components of the monitoring and mitigation service 114 may include physical hardware components, one or more virtualized components or a combination thereof. Additionally, the components of the monitoring and mitigation service 114 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the monitoring and mitigation service 114.

As illustrated, the monitoring and mitigation service 114 includes a processing unit 202, a network interface 204, a computer readable medium drive 206, and an input/output device interface 208, all of which may communicate with one another by way of a communication bus. The components of the monitoring and mitigation service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208. In some embodiments, the monitoring and mitigation service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the monitoring and mitigation service 114. The memory 210 may further include computer program instructions and other information for implementing aspects of the present disclosure. For example, in one embodiment, the memory 210 includes a command and control monitoring component 216 that is configured to monitoring attributes of network resources and characterize or identify computing devices as command and control nodes. The memory 210 further includes a network mitigation component 218 that is configured to identify and implement network mitigation information as described herein.

Turning now to FIGS. 3A-3D, illustrative interactions of the components of the system 100 will be described. For purposes of the illustration, it can be assumed that a network service 110 has been configured in a manner to implement a plurality of network services 112 on behalf of a customer. The present application is not intended to be limited to any particular type of services or that the number of individual services that may be accessed or generate processing results as part of an execution of an application on behalf of customers. Additionally, for purposes of the present application, computing device 104 will be considered a command and control node that is being utilized by a third party (e.g., an entity or software code) to cause network-based resources to cause an attack on computing device 102 (or a network associated with computing device 102). Such network-based resources can be considered to be compromised or manipulated when utilized in such a manner.

Figure 3A:
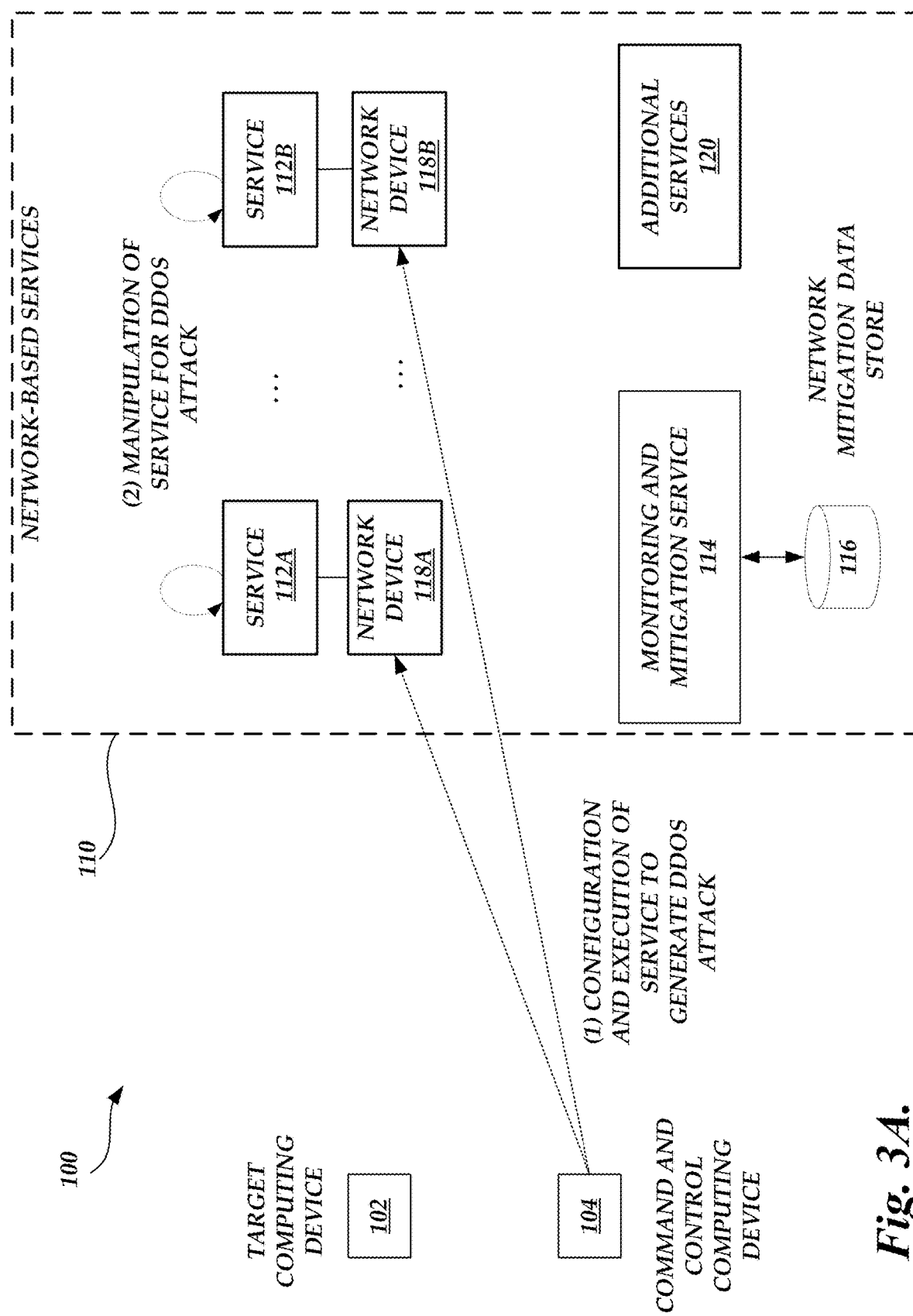
FIGS. 3A-3D are block diagrams of the system of FIG. 1 illustrating various interactions of the components related to monitoring network based services and implementing network mitigation techniques in accordance with aspects of the present application.

With reference to FIG. 3A, an illustrative interaction prior to the implementation of network mitigation techniques will be described. The present application does not require that an attack, such as a coordinated DDOS attack, must occur prior to implementation of the network mitigation techniques described herein. Accordingly, the interaction is illustrative. At (1), a command and control node configures the execution of the services from the network-based services 110. Illustratively, the configuration of the services includes the generation of commands or configuration that causes the instantiation of one or more network services 112A, 112B for purposes of executing a coordinated attack. The configuration of the services 112A, 112B can also include one or more previously instantiated services. One skilled in the relevant art will appreciate that a computing device/individual may utilize various techniques to be able to manipulate the network resources 112A, 112A, including various fraudulent or prohibited actions.

Figure 3B:
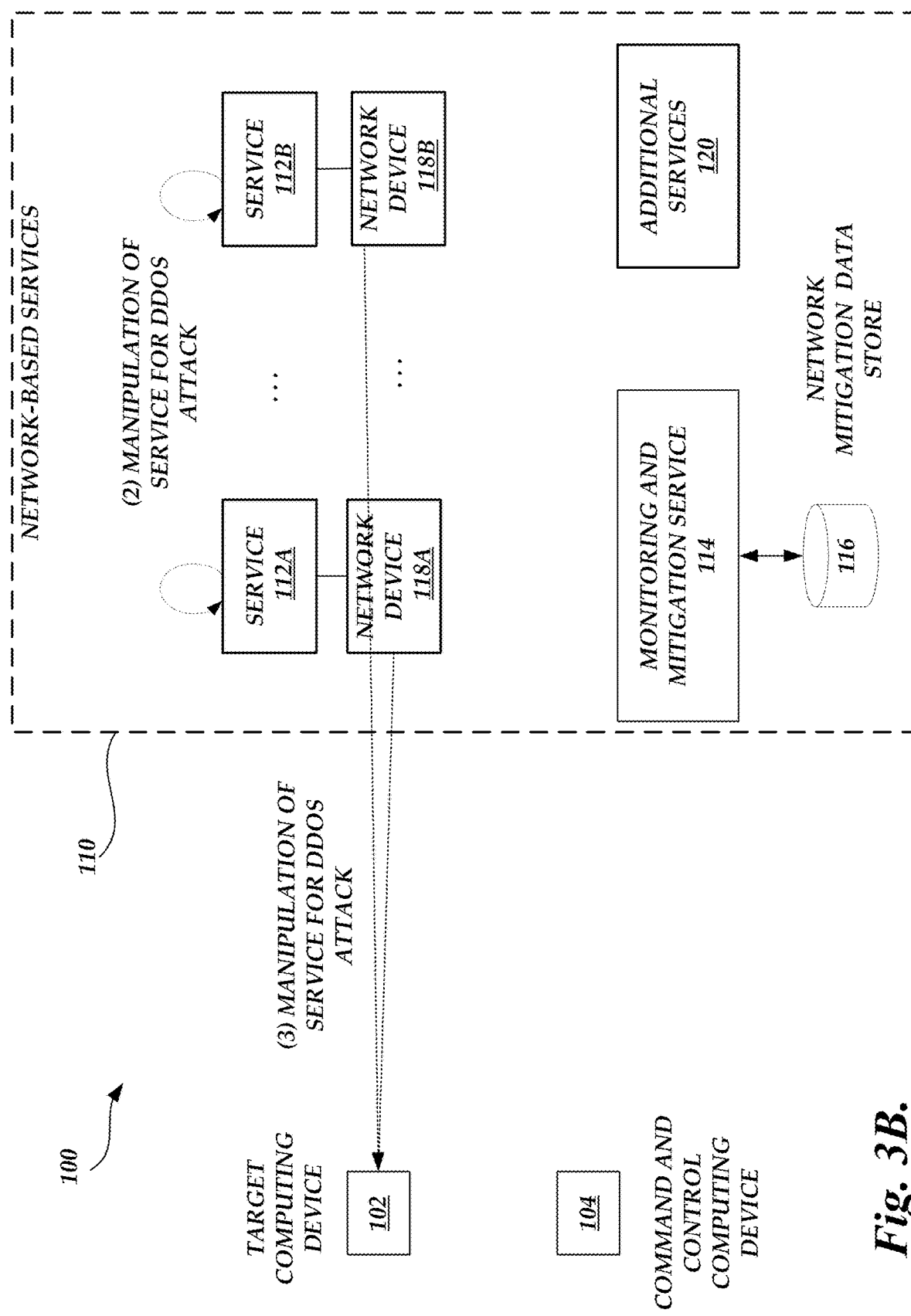

At (2), the network service 110 obtains the configuration and commands transmitted by the command and control node on the network service 110. Responsive to typical customer interaction, the network service 110 causes the implementation of the configuration or execution of the code such that the network services 112A, 112B are considered manipulated for purposes of participating in a coordinated attack. As illustrated in FIG. 3B, the network services 112A, 112B can then carry out the coordinated attack against a target computing device or network, illustratively represented at 102. As described above, the targets (e.g., computing devices) of the coordinated attacks may be subject to significant disruption or limitation of operational status, which may be independent of the network service provider. Additionally, the manipulation of computing resources (e.g., services 112A, 112B) for purposes of generating large scale network attacks, such as DDOS attacks, especially in multi-tenant network resources can present significant inefficiencies for the network service provider, including limiting functionality of network resources, consuming network bandwidth and disrupting operations or functionality provided by the network service 110.

Figure 3C:
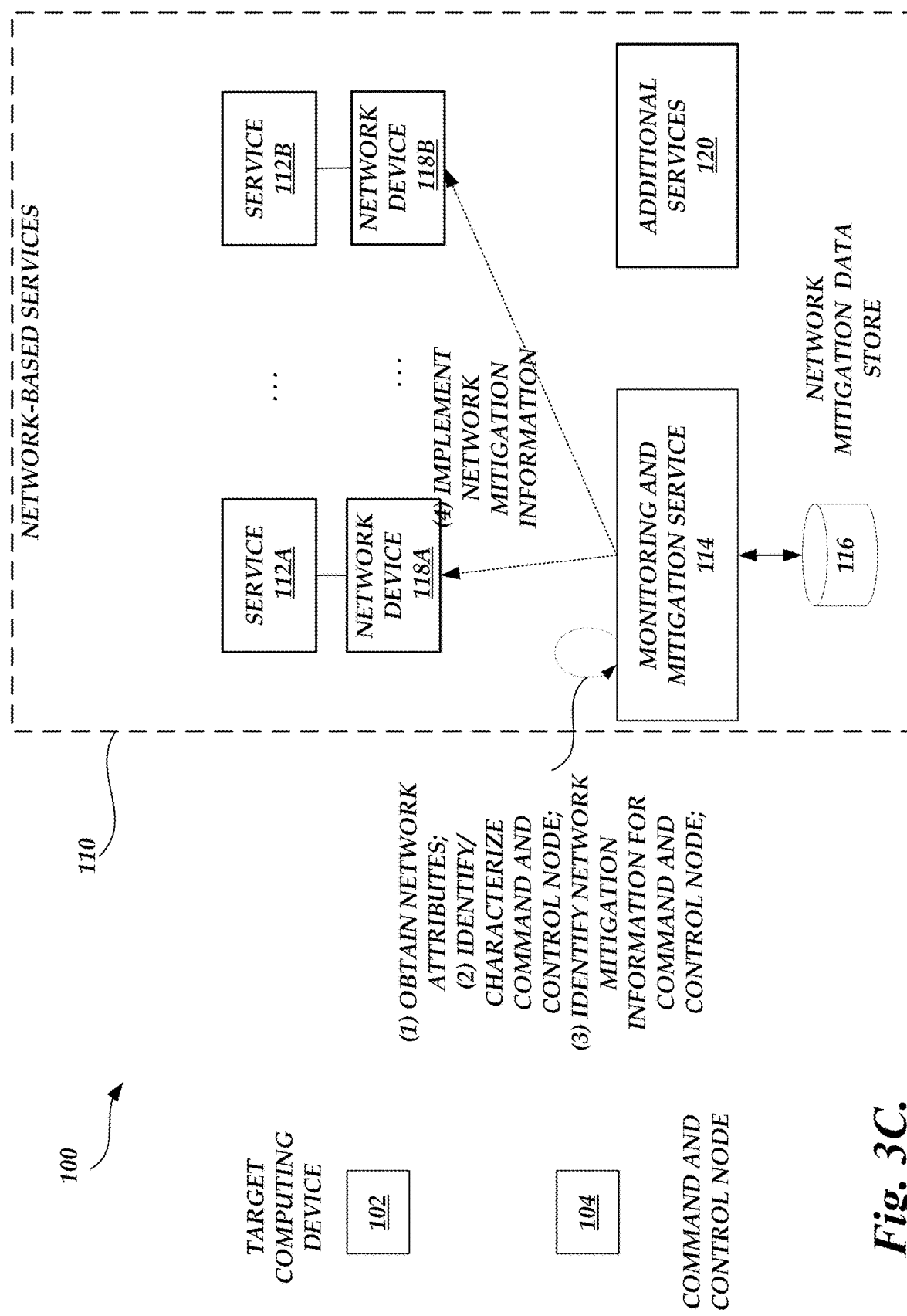

With reference to FIG. 3C, at (1) the monitoring and mitigation service 114 can obtain network attributes or metrics associated with the configurations or commands generated by the command and control node 104 or the resulting effect on the manipulated network services 112A, 112B. Based on the identified attributes, the monitoring and mitigation service 114 can identify or characterize the computing device as a command and control node 104, or other label/term reflective of a similar characterization, at (2). Illustratively, the identification or characterization of the command and control node can be based on a variety of information, including machine learning techniques, historical information, automated processes, manual processing and the like. Additionally, the identification or characterization of the command and control node can include confidence values that indicate an estimate of the likelihood of the identification or characterization based on the processing of the network attributes. The identification or characterization of the command and control node can also be representative of exceeding a threshold confidence or minimal confidence value.

In some embodiments, the processes described at (1) and (2) may be provided as inputs to the monitoring and mitigation service 114 by a separate service, such as additional services 120. In this regard, the separate service may be configured to provide the identification and characterizations as described herein and provide them as inputs to the monitoring and mitigation service 114.

At (3), the monitoring and mitigation service 114 identifies network mitigation information for the identified command and control node. As described above, the monitoring and mitigation service can identify network mitigation information in the form of null routing addresses that will cause network communications received from the identified command and control node to be terminated or otherwise not delivered to the intended network-based resources. More specifically, in one embodiment, the null routing addresses can correspond to the utilization of 32-bit addresses in the routing information that can define routing information to a network address that does not correspond to the command and control node or that results in the termination/dropping of communications. In another embodiment, the null routing addresses can correspond to the utilization of 128-bit addresses in the routing information that can define routing information that does not correspond to the command and control node or that results in the termination/dropping of communications. This will cause the cessation of communications to the command and control node. Illustratively, the cessation of communication can include, but is not limited to, the termination, blocking or mitigation of outgoing network traffic that would be received by the command and control node. The monitoring and mitigation service 114 can maintain a set of such null addresses that may be utilized multiple times for different applications of the mitigation technique and illustratively are not unique to the command and control node.

In some embodiments, the network mitigation information can be associated with expiration criteria for the routing components that receive and implement the network mitigation technique. The expiration criteria can correspond to time-based criteria or event-based criteria. After the expiration of the network mitigation information, the monitoring and mitigation service 114 can renew the network mitigation information and cause the withdrawal of the network mitigation information.

At (4), the monitoring and mitigation service can propagate the network mitigation information, such as the null routing address, to routing components within the network service provider network. The routing components will then be updated with the network mitigation information to implement the network mitigation technique. The receiving routers can propagate the network mitigation information such that network mitigation information can be implemented across multiple regions. In other embodiments, the monitoring and mitigation service 114 can select network devices 118 by specific region so that only a partial distribution of the network mitigation information is provided. The monitoring and mitigation service 114 can further implement additional logic that will keep the network mitigation information from being further updated or overwritten for a period of time.

Figure 3D:
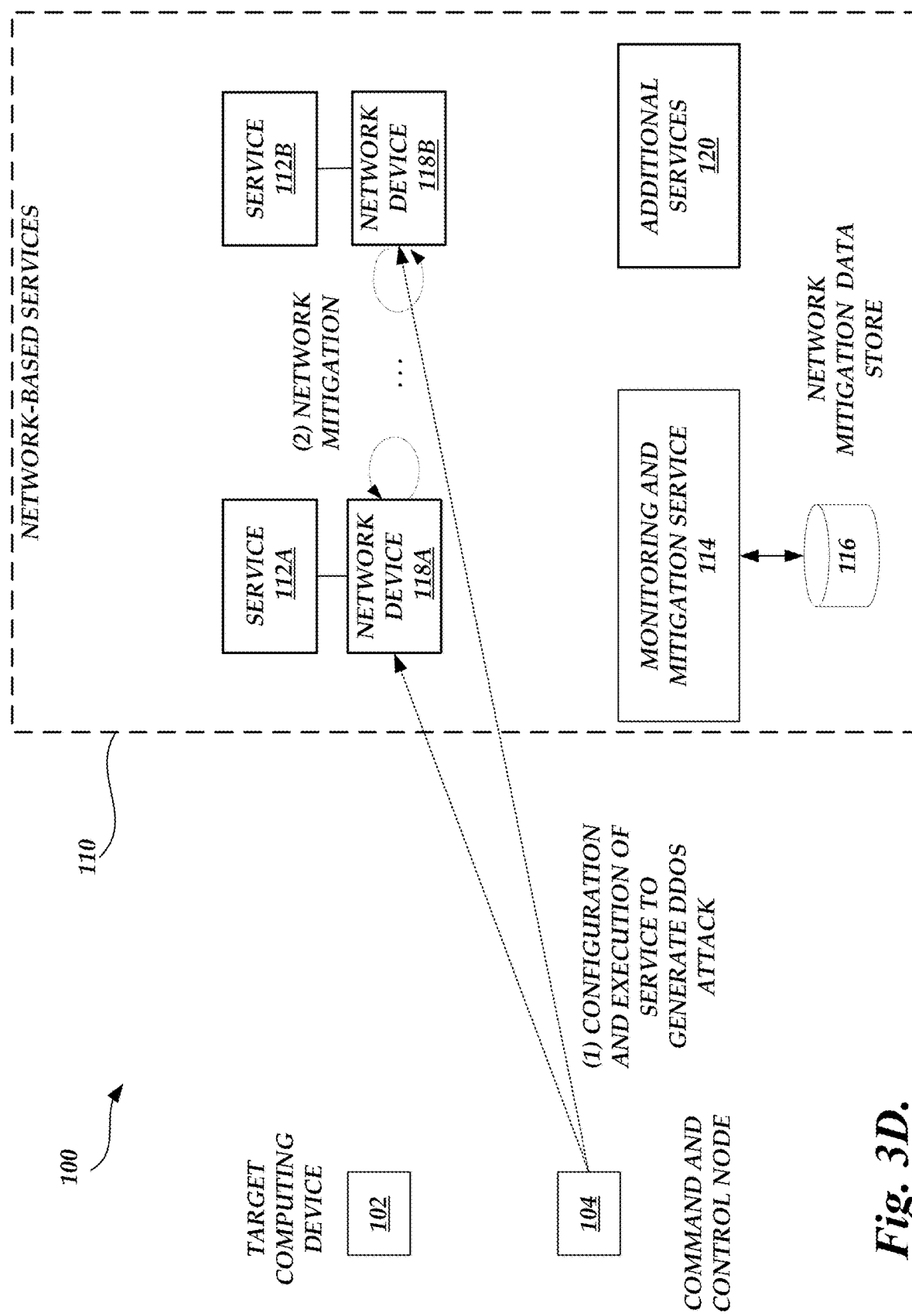

Turning now to FIG. 3D, after the implementation of the network migration, assume at (1) that the command and control node attempts to further provide configuration or commands to generate or perpetuate the coordinate attack. As illustrated in FIG. 3D, the network devices 118A, 118B implement network mitigation such that communications between the services 112A, 112B and the command and control module are no longer possible.

In some embodiments, the network mitigation information can be associated with expiration criteria for the routing components that receive and implement the network mitigation technique. After the expiration of the network mitigation information, the monitoring and mitigation service 114 can renew the network mitigation information and cause the withdrawal of the network mitigation information.

Figure 4:
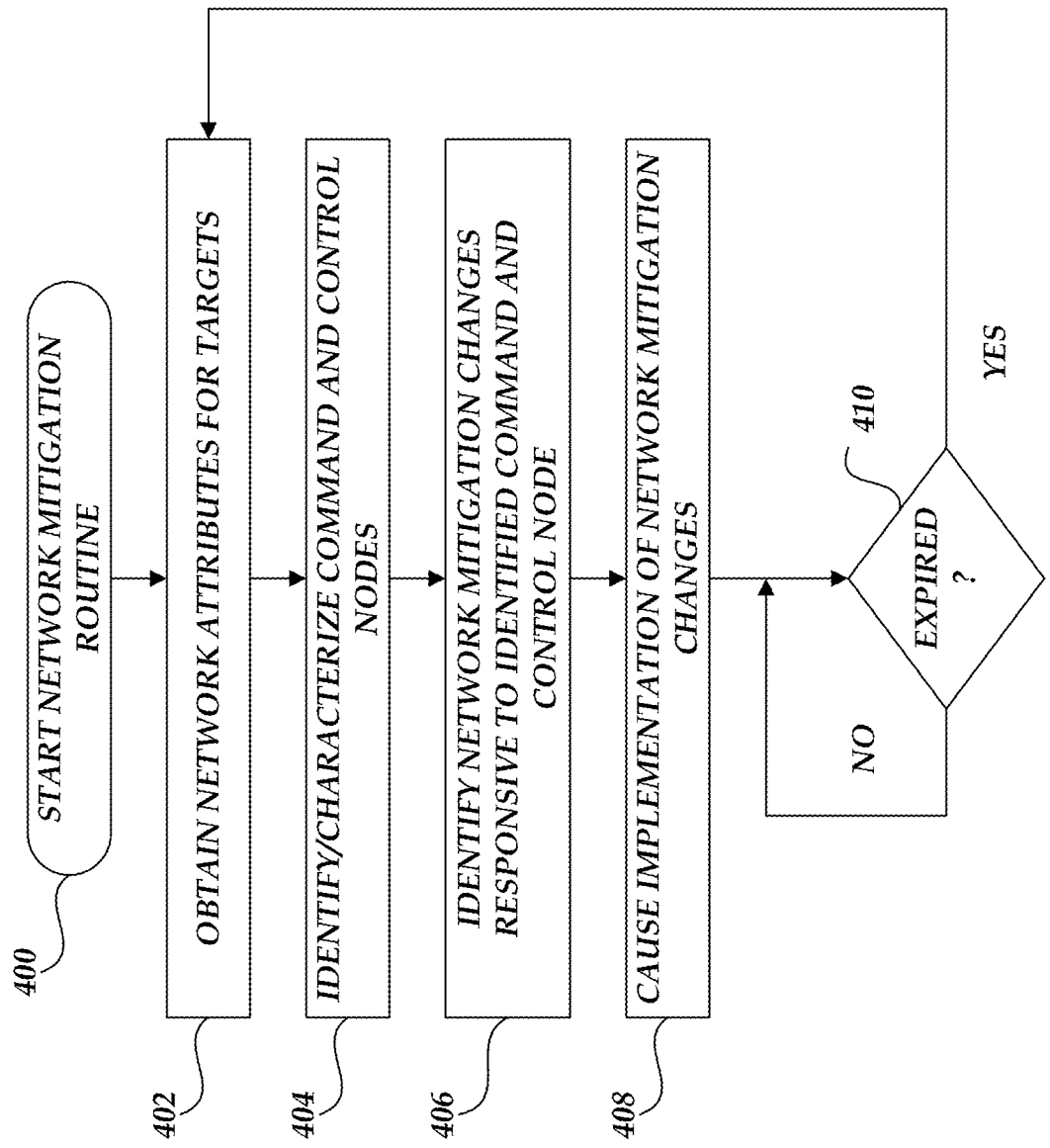
FIG. 4 is a flow diagram depicting an example routine for network mitigation monitoring in accordance with aspects of the present application.

Turning now to FIG. 4, a routine 400 for network management utilizing network mitigation information will be described. Routine 400 is illustratively implemented by the monitoring and mitigation service 114. At block 402, the monitoring and mitigation service 114 can obtain network attributes or metrics associated with the configurations or commands generated by the command and control node 104 (as characterized or identified) or the resulting effect on the manipulated network services 112A, 112B.

At block 404, based on the identified attributes, the monitoring and mitigation service 114 can identify or characterize the command and control node. Illustratively, the identification or characterization of the command and control node can be based on a variety of information, including machine learning techniques, historical information, automated processes, manual processing and the like. Additionally, the identification or characterization of the command and control node can include confidence values that indicate an estimate of the likelihood of the identification or characterization based on the processing of the network attributes. The identification or characterization of the command and control node can also be representative of exceeding a threshold confidence or minimal confidence value.

In some embodiments, the processes described at block 402, and 404 may be provided as inputs to the monitoring and mitigation service 114 by a separate service, such as additional services 120. In this regard, the separate service may be configured to provide the identification and characterizations as described herein and provide them as inputs to the monitoring and mitigation service 114.

At block 406, the monitoring and mitigation service 114 identifies network mitigation information for the identified compromised command and control node. As described above, the monitoring and mitigation service can identify network mitigation information in the form of null routing addresses that will cause network communications associated with the identified command and control node to be terminated or otherwise not delivered to the intended recipient. Illustratively, the cessation of network communications can illustratively terminate, limit or redirect communications transmitted to the command and control node. More specifically, in one embodiment, the null routing addresses can correspond to the utilization of 32-bit addresses in the routing information that can define routing information to a network address that does not correspond to the command and control node or that results in the termination/dropping of communications. In another embodiment, the null routing addresses can correspond to the utilization of 128-bit addresses in the routing information that can define routing information that does not correspond to the command and control node or that results in the termination/dropping of communications. This will cause the cessation of communications to the command and control node. As described above, the cessation of communication can include, but is not limited to, the termination, blocking or mitigation of outgoing network traffic that would be received by the command and control node. One skilled in the relevant art will appreciate that variations of the null routing address can be implement including different size of null routing address, partial network addresses, and the like. The monitoring and mitigation service 114 can maintain a set of such null addresses that may be utilized multiple times for different applications of the mitigation technique and illustratively are not unique to the command and control node.

In some embodiments, the network mitigation information can be associated with expiration criteria for the routing components that receive and implement the network mitigation technique. The expiration criteria can correspond to time-based criteria or event-based criteria. After the expiration of the network mitigation information, the monitoring and mitigation service 114 can renew the network mitigation information and cause the withdrawal of the network mitigation information.

At block 408 causes the implementation of the network mitigation technique. Illustratively, the monitoring and mitigation service can propagate the network mitigation information, such as the null routing address, to routing components within the network service provider network. The routing components will then be updated with the network mitigation information to implement the network mitigation technique. The receiving routers can propagate the network mitigation information such that network mitigation information can be implemented across multiple regions. In other embodiments, the monitoring and mitigation service 114 can select network devices 118 by specific region so that only a partial distribution of the network mitigation information is provided. The monitoring and mitigation service 114 can further implement additional logic that will keep the network mitigation information from being further updated or overwritten for a period of time.

In some embodiments, the network mitigation information can be associated with expiration criteria for the routing components that receive and implement the network mitigation technique. After the expiration of the network mitigation information, the monitoring and mitigation service 114 can renew the network mitigation information and cause the withdrawal of the network mitigation information. Accordingly, at decision block 410, the monitoring and mitigation service 114 determines whether the network mitigation information has expired. If so, the routine returns to block 402. If not, the routine remains at decision block 410.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing network-based services, the system comprising:
    one or more computing devices associated with a processor and a memory for executing computer-executable instructions to implement a monitoring and mitigation service, wherein the monitoring and mitigation service is configured to:
        obtain one or more attributes of utilization of network-based resources of a network service provider by a computing device, wherein the one or more attributes are associated with at least one of a configuration or a command provided by the computing device;
        characterize the computing device as a command and control node based on the one or more attributes of the utilization of the network-based resources;
        identify network mitigation information, wherein the network mitigation information is null address information associated with expiration criteria;
        cause an implementation of the network mitigation information in one or more routing components associated with the network-based resources such that communications with the command and control node are mitigated;
        determine that the network mitigation information has expired; and
        based on determining that the network mitigation information has expired, cause at least one of a renewal of the network mitigation information or withdrawal of the network mitigation information.

2. The system as recited in claim 1, wherein characterizing the computing device as the command and control node is associated with a confidence score exceeding a threshold.

3. The system as recited in claim 1, wherein the monitoring and mitigation service causes the implementation of the network mitigation information in a plurality of routing components.

4. The system as recited in claim 3, wherein the plurality of routing components corresponds to two or more regions associated with the network-based resources.

5. The system as recited in claim 1, wherein the monitoring and mitigation service causes the implementation of the network mitigation information in routing components corresponding to identified regions.

6. The system as recited in claim 1, wherein the expiration criteria correspond to time-based criteria.

7. A method for managing for network-based services comprising:
    obtaining one or more attributes of network resource utilization, wherein the one or more attributes of the network resource utilization correspond to execution of network-based resources of a network service provider by a computing device;
    characterizing the computing device as a command and control node based on the one or more attributes of the network resource utilization;
    identifying network mitigation information responsive to characterizing the computing device as the command and control node, wherein the network mitigation information causes a mitigation of network communications between the command and control node and the network-based resources; and
    causing an implementation of the network mitigation information in one or more routing components associated with the network-based resources.

8. The method of claim 7 further comprising:
    monitoring the one or more attributes of the network resource utilization corresponding to the execution of the network-based resources responsive at least one of a configuration or command provided by the command and control node.

9. The method as recited in claim 7, wherein characterizing the computing device corresponds to a characterization of the computing device as a command and control node that has compromised at least one network-based resource.

10. The method as recited in claim 7, wherein causing the implementation of the network mitigation information includes causing the implementation of the network mitigation information in a plurality of routing components.

11. The method as recited in claim 10, wherein the plurality of routing components corresponds to two or more regions associated with the network-based resources.

12. The method as recited in claim 7, wherein causing the implementation of the network mitigation information includes causing the implementation of the network mitigation information in identified regions, wherein individual routing components correspond to the identified regions.

13. The method as recited in claim 7, wherein the network mitigation information is associated with expiration criteria, the method further comprising determining that the network mitigation information has expired.

14. The method as recited in claim 13 further comprising causing at least one of a renewal of the network mitigation information or withdrawal of the network mitigation information based on determining that the network mitigation information has expired.

15. The method as recited in claim 13, wherein the expiration criteria correspond to event-based criteria.

16. The method as recited in claim 7, wherein the network mitigation information includes null address information.

17. A method for managing network-based services comprising:
responsive to identification of a computing device as a command and control node associated with utilization of network-based resources of a network service provider to generate a coordinated network attack, identifying network mitigation information to cause a mitigation of network communications between the command and control node and the network-based resources; and
causing an implementation of the network mitigation information in one or more routing components associated with the network-based resources.

18. The method of claim 17 further comprising;
monitoring one or more attributes of network resource utilization by the computing device, the network resource utilization corresponding to execution of the network-based resources responsive at least one of a configuration or command provided by the computing device; and
identifying the computing device as the command and control node based on the one or more attributes of the network resource utilization.

19. The method as recited in claim 17, wherein causing the implementation of the network mitigation information includes causing the implementation of the network mitigation information in a plurality of routing components.

20. The method as recited in claim 17, wherein the network mitigation information is associated with expiration criteria, the method further comprising determining that the network mitigation information has expired.

21. The method as recited in claim 20 further comprising causing at least one of a renewal of the network mitigation information or withdrawal of the network mitigation information based on determining that the network mitigation information has expired.

22. The method as recited in claim 20 further comprising obtaining the identification of the command and control node from a network-based service.

23. The method as recited in claim 17, wherein the network mitigation information includes null address information.

24. The method as recited in claim 17, wherein causing the implementation of the network mitigation information in the one or more routing components associated with the network-based resources includes causing a cessation of communications directed to the command and control node.

* * * * *